(12) United States Patent
Mellin

(10) Patent No.: US 6,715,271 B2
(45) Date of Patent: Apr. 6, 2004

(54) MOWER-CONDITIONER

(75) Inventor: Michael James Mellin, Esmoulins (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/277,906

(22) Filed: Oct. 21, 2002

(65) Prior Publication Data

US 2003/0079456 A1 May 1, 2003

(30) Foreign Application Priority Data

Oct. 30, 2001 (DE) .......................................... 101 53 564

(51) Int. Cl.$^7$ ............................................... A01D 82/00
(52) U.S. Cl. ................................. 56/16.4 B; 56/DIG. 1
(58) Field of Search ........................ 56/16.4 R, 16.4 A, 56/16.4 B, 16.4 C, DIG. 1

(56) References Cited

U.S. PATENT DOCUMENTS

| | | |
|---|---|---|
| 3,324,639 A | 6/1967 | Halls et al. |
| 4,472,927 A | 9/1984 | Vogt et al. |
| 4,637,204 A | 1/1987 | Benson et al. |
| 4,949,535 A | * 8/1990 | Hurlburt .................... 56/16.4 R |
| 4,961,303 A | 10/1990 | McCarty et al. |
| 5,033,257 A | 7/1991 | Walters |
| 5,531,062 A | * 7/1996 | Pfrimmer .................. 56/16.4 B |

* cited by examiner

Primary Examiner—Thomas B. Will
Assistant Examiner—Meredith Petravick

(57) ABSTRACT

A mower conditioner includes upper and lower conditioner rolls with the upper roll extending between, and being rotatably mounted to, a pair of vertically swingable arms. A linkage arrangement is coupled between the frame supporting the arms and the arms, with one part of the linkage being associated with a stop for limiting the range of movement of the upper roll toward the lower roll, and with another part of the linkage being coupled to a spring arrangement for biasing the upper roll toward the lower roll. The stop is configured as a pair of wedge-shaped members having respective inclined surfaces engaged with each other and held in an adjusted position by a nut and bolt arrangement, the range of movement of the upper roll toward the lower roll changing in response to tightening or loosening the nut on the bolt.

5 Claims, 2 Drawing Sheets

MOWER-CONDITIONER

FIELD OF THE INVENTION

The invention concerns a mower-conditioner with at least one roll for the conditioning of harvested crop being adjustable relative to another roll for defining a desired gap therebetween through which crop is conducted, the gap being determined by an adjustable stop.

BACKGROUND OF THE INVENTION

U.S. Pat. Nos. 5,033,257 and 4,472,927 each disclose a mower-conditioner with two rolls rotating in opposite directions that leave a gap between them through which the harvested crop is conducted and is conditioned on the basis of the mechanical action of the profiled rolls. In order to adjust the height of the gap, the upper roll is supported in bearings at each end in a pivot arm, whose lower end position is determined by means of a linkage. For this purpose, the linkage is provided with a threaded region at the end region opposite the pivot arm to which one or more nuts may be applied that can be brought into contact with a stop formed on the housing of the mower-conditioner.

The problem underlying the invention is seen in the fact the threaded connection between the nut and the threaded region is heavily loaded and becomes rigid after extended use on the basis of the constant spring loaded rotary movement of the roll, so that the position can hardly be adjusted.

SUMMARY OF THE INVENTION

This problem is solved according to the invention, where the patent claims cite characteristics that further develop the solution to great advantage.

In this way, the forces acting in the direction of adjustment are no longer absorbed by the thread, but by the stop that is now separate from the thread. Consequently, the thread is no longer damaged and a readjustment of the stop can be performed at any time without any problems.

A parallel adjustment of the support surfaces, even with increased slope, is achieved by the use of two wedge-shaped elements that slide upon each other with their inclined surfaces and thereby increase or reduce the spacing of the support surfaces. The repositioning can be performed in steps by the use of projections, hooks, recesses or the like, or performed without any steps.

A repositioning without any steps is possible among others if a screw is guided through and is brought into contact with it and is retained in a threaded hole in the other element. In place of a screw, a threaded bushing or the like could also be used.

A possibility exists in the readjustment of the width of the gap (preferably 2 to 5 mm.) from an easily accessible location by supporting each end of the roll in a pivot arm to connect the pivot arms in each case with a linkage and to retain the linkages by means of a suspension in, at or on the stop relative to a frame or housing of the mower-conditioner. The linkage can be configured as a simple rod or strut, as a steel cable, a chain or the like.

According to another method, the stop is brought directly into the pivoting region of the pivot arm. In this case, one as well as two wedge-shaped elements may be used.

The linkage can be securely retained at the stop if it is configured in a forked shape and penetrates the stop where its ends are connected by means of a pin or the like.

The reliability and/or service friendliness of known mower-conditioners can be improved if a stop according to the state of the art is replaced by a stop with one or two wedge-shaped elements, whose slope is used for a repositioning transverse to the direction of movement of the roll.

BRIEF DESCRIPTION OF THE DRAWINGS

The drawing shows an embodiment of the invention that shall be described in greater detail in the following.

DESCRIPTION OF THE PREFERRED EMBODIMENT

Figure 1:
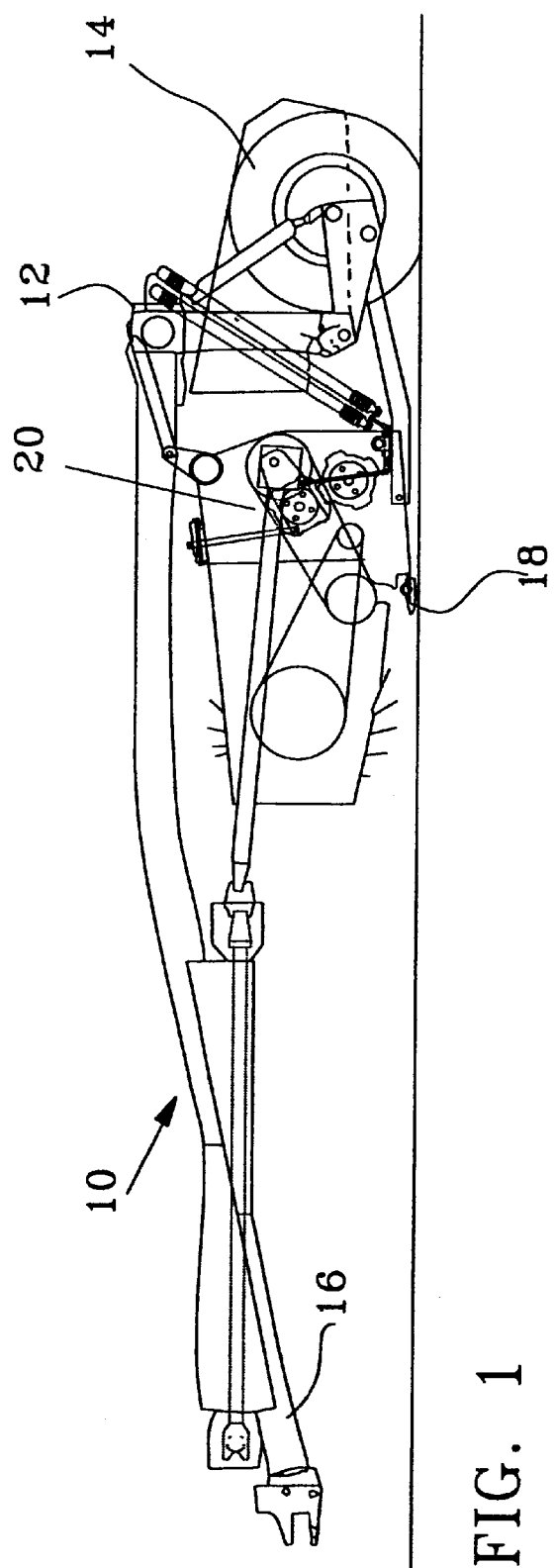
FIG. 1 shows a somewhat schematic, left side view of a mower-conditioner with a conditioning arrangement.

FIG. 1 shows a mower-conditioner 10 in a configuration known in itself with a frame 12, a running gear 14, a towbar 16, a mower head 18, and a conditioning arrangement 20.

Figure 2:
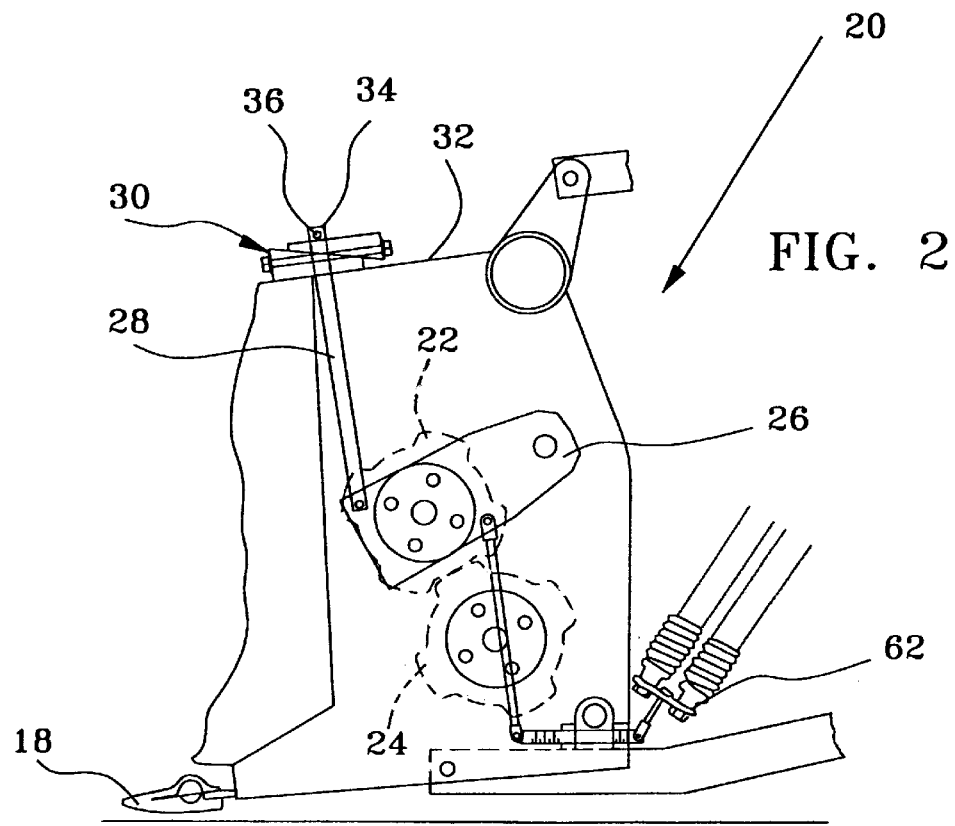
FIG. 2 shows an enlarged side view of the conditioning arrangement with an adjustable stop.

According to FIG. 2, the conditioning arrangement 20 contains an upper and a lower roll 22 and 24, respectively, each of which is provided with a congruent outer profile, that leaves a small gap between them through which harvested crop coming from the mower head 18 is conducted and thereby is crushed for conditioning. While the lower roll 24 is supported in stationary bearings, but free to rotate, the upper roll 22 is engaged at each end in a pivot arm 26 so that it can move vertically under spring force relative to the lower roll 24.

For the adjustment of the gap or the contact pressure of the upper roll 22 against the lower roll 24, a linkage 28 is provided on each side of the conditioning arrangement 20 that is connected in its lower region, free to pivot, with the pivot arm 26 and that is brought into contact at its upper end region with a stop 30, that is connected with a housing 32 of the conditioning arrangement 20. In its upper end region, the linkage 28 is configured with a forked end where two legs 34 of the forked end are bridged by a pin 36.

In this embodiment, the stop 30 is composed of two wedge-shaped elements 38. In this embodiment, each element 38 is configured in the side view as a right triangle and therefore contains a surface 40 corresponding to a hypotenuse, a contact surface 42 in the vertical direction corresponding to a cathetus, and a support surface 44 corresponding to a horizontal cathetus. A bore 46 extends through each element 38 that is generally in the center and vertical to the contact surface 42. A recess 48 extends through each element 38 that is generally central and vertical to the support surface 44.

Figure 3:
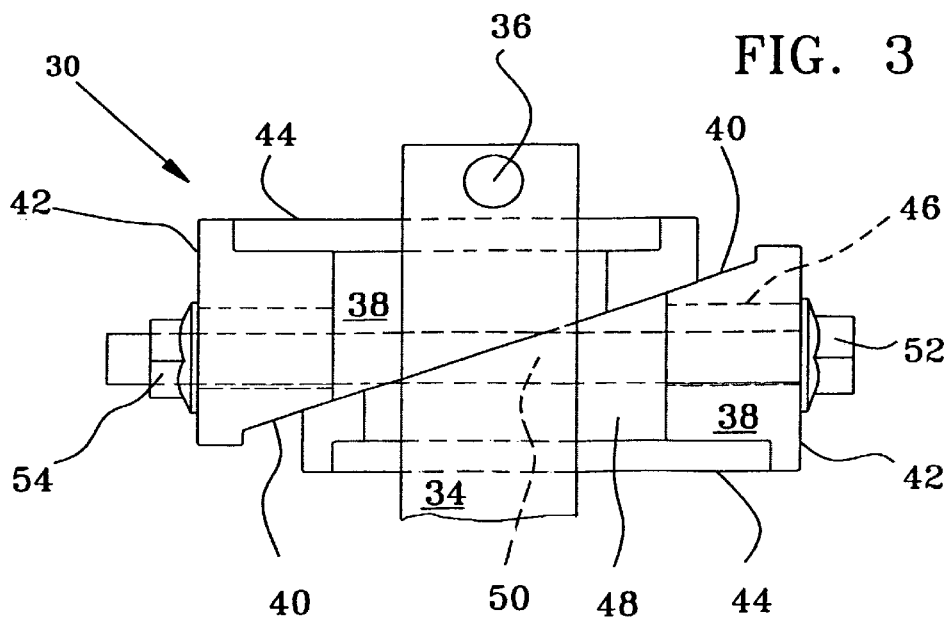
FIG. 3 shows an enlarged view of the adjustable stop.

In the installed condition, the elements 38 are indexed through 180° to each other and the surfaces 40 are in contact with each other. A threaded element 50 extends through the bores 46, particularly in the form of a screw or a threaded rod. The outside diameter of the threaded element 50 is considerably less than the inside diameter of the bore 46. As can be seen in FIG. 3, the threaded element 50 has a head 52 in contact with the right contact surface 42 and receives a nut 54 on its left end, which is in contact with the corresponding contact surface 42. The nut 54 may be configured as a locknut, or it may be secured with a jam nut. The lower element 38 is preferably fastened to the housing 32, but this is not mandatory.

The recess 48 is selected so that it is sufficiently large that it can leave enough free space for the penetration of the legs 34 of the linkage 28 alongside the threaded element 50, particularly within a limited adjustment region of the elements 38. The necessary free space is a function of the shape of the legs 34, so that, for example, if the legs 34 are formed of flat steel, the recess 48 can be held to a smaller size than that for the legs 34 formed of cylindrical steel bars.

The linkage 28 is mounted on, at, or in the stop 30 in such a way that the legs 34 penetrate through the free spaces on both sides of the threaded element 50 within the recess 48 up to a point under the upper element 38 and beyond that and is connected there with the pin 36. The pin 36 can be secured in its position by a thread and also by cotter pins.

As can be seen from the preceding description, but also with a view of FIG. 3, a rotation of the nut 54 results in a repositioning of the elements 38 relative to each other. A repositioning of the elements 38 has the result of changing the distance between the two support surfaces 44, which in turn leads to a vertical movement of the pin 36, and with it, the linkage 28. A repositioning of the linkage 28 at both ends of the upper roll 22 has the result that the distance between the rolls 22 and 24 is changed or the contact pressure of the upper roll 22 upon the lower roll 24 is changed. The forces originating from the upper roll 22 are transmitted over the support surfaces 44 and the surfaces 40 to the elements 38, while the threaded element 50 remains essentially unloaded on the basis of the small horizontal vector. It can be seen that the forces in the threaded element 50 are directly proportional to the inclination of the surfaces 40.

In another embodiment, not shown, a stop is fastened in one or two wedge-shaped elements to the housing 32 in such a way that the underside of the pivot arm 26 can be brought into contact with it. In this embodiment, the wedge-shaped element or elements are also shifted by means of a threaded element.

Having described the preferred embodiment, it will become apparent that various modifications can be made without departing from the scope of the invention as defined in the accompanying claims.

What is claimed is:

1. In a mower-conditioner including a housing having opposite sides supporting at least one conditioner roll extending between them for conditioning harvested crop, and that can be repositioned by an adjustable stop for forming a gap of a desired size through which the harvested crop is conducted, the improvement comprising: a pair of pivot arms respectively located at opposite ends of, and rotatably supporting, said at least one conditioner roll from said opposite sides of said housing; linkages being coupled to each of said pivot arms; said stop including at least one wedge-shaped element that can be repositioned transverse to the direction of movement of said at least one conditioner roll; and said linkages being respectively associated with said stop for supporting said at least one roll at a desired position for creating said desired gap.

2. The mower-conditioner, as defined in claim 1, wherein said stop includes two wedge-shaped elements that are arranged so as to slide against each other.

3. The mower-conditioner, as defined in claim 1, wherein each of said linkages includes a forked shape end having legs straddling said stop; and a pin extending between and being received in said legs.

4. In a mower-conditioner including a housing having opposite sides supporting at least one conditioner roll extending between them for conditioning harvested crop, and that can be repositioned by an adjustable stop for forming a gap of a desired size through which the harvested crop is conducted, the improvement comprising: said stop further including at least one wedge-shaped element that can be repositioned transverse to the direction of movement of said at least one conditioner roll; said stop further including a threaded element engaging said at least one wedge-shaped element for selectively repositioning said wedge-shaped element in response to turning said threaded element; and said linkages being respectively associated with said stop for supporting said at least one roll at a desired position for creating said desired gap.

5. A stop for use in limiting the range of movement of a movable upper roll of a mower-conditioner, comprising:

two wedge-shaped elements having respective first and second surfaces inclined from horizontal and arranged against each other; said two wedge elements respectively having first and second support surfaces which are parallel to each other when said first and second inclined surfaces are engaged with each other; and a threaded element being associated with said two wedge elements for repositioning the two wedge elements relative to each other in response to turning said threaded element and thereby changing the distance between said first and second support surfaces.

* * * * *